United States Patent
Tan et al.

(10) Patent No.: US 6,373,481 B1
(45) Date of Patent: Apr. 16, 2002

(54) METHOD AND APPARATUS FOR AUTOMATIC FOCUSING IN AN IMAGE CAPTURE SYSTEM USING SYMMETRIC FIR FILTERS

(75) Inventors: Yap-Peng Tan; Brent Thomas, both of Chandler; Tinku Acharya, Tempe, all of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/383,117

(22) Filed: Aug. 25, 1999

(51) Int. Cl.$^7$ .............................. G06F 13/00; G06F 3/00
(52) U.S. Cl. ........................................ 345/342; 348/273
(58) Field of Search ................................ 348/342, 345, 348/349, 39, 273, 280; 396/77, 121, 122; 382/272

(56) References Cited

U.S. PATENT DOCUMENTS

| | | | |
|---|---|---|---|
| 5,640,635 A | * | 6/1997 | Fullman et al. ............... 396/77 |
| 5,808,697 A | | 9/1998 | Fujimura et al. |
| 5,835,143 A | * | 11/1998 | Kakiuchi ..................... 348/349 |
| 6,151,415 A | * | 11/2000 | Acharya et al. ............. 348/345 |
| 6,154,253 A | * | 11/2000 | Kiri et al. ................... 348/345 |

FOREIGN PATENT DOCUMENTS

| | | |
|---|---|---|
| EP | 0436511 A | 7/1991 |
| EP | 0633688 A | 1/1995 |
| EP | 0833501 A | 4/1998 |
| EP | 0860988 A | 8/1998 |

* cited by examiner

Primary Examiner—Wendy R. Garber
Assistant Examiner—Jacqueline Wilson
(74) Attorney, Agent, or Firm—Blakely, Sokoloff, Taylor & Zafman LLP (57) ABSTRACT

In one embodiment, a method for determining a focus value in an image, including selecting an area of interest in the image and a color plane of interest, is described. The color plane of interest within the area of interest is filtered to produce a filtered region. The mean absolute value of the filtered region is determined.

26 Claims, 5 Drawing Sheets

METHOD AND APPARATUS FOR AUTOMATIC FOCUSING IN AN IMAGE CAPTURE SYSTEM USING SYMMETRIC FIR FILTERS

BACKGROUND OF THE INVENTION

1. Field of the Invention

The invention relates to the field of digital imaging. Specifically, the present invention is directed towards a method and apparatus for automatic focusing in an image capture system using symmetric FIR filters.

2. Description of Related Art

Use of digital image capture systems such as digital cameras for video and still image capture has become very prevalent in many applications. Video capture may be used for such applications as video conferencing, video editing, and distributed video training. Still image capture with a digital camera may be used for such applications as photo albums, photo editing, and compositing.

Many digital video and still image capture systems use an image sensor constructed of an array of light sensitive elements, each commonly referred to as a "pixel" element. Each pixel element is responsible for capturing one of three-color channels: red, green, or blue. Specifically, each pixel element is made sensitive to a certain color channel through the use of a color filter placed over the pixel element such that the light energy reaching the pixel element is due only to the light energy from a particular spectrum. Each pixel element generates a signal that corresponds to the amount of light energy to which it is exposed.

Digital image capture systems are typically expected to operate under a variety of conditions. In addition, features such as auto-focusing and auto-exposure are expected to be integrated features. These are typically hardware intensive processes. In the case of auto-focusing, speed and accuracy is essential for capturing high-quality images. Thus, it would be desirable to implement efficient and hardware friendly auto-focusing processes.

DETAILED DESCRIPTION OF THE INVENTION

The present invention provides an automatic focusing method and apparatus developed for digital image capture systems such as digital imaging and video cameras (to be generally referred to herein as "camera"). During the focusing phase, a sequence of images at different focal lengths is captured. After being captured, each image is filtered by a symmetric finite impulse response (FIR) filter. A focus value, which indicates the level of camera focus, is derived from the filtered image. An FIR filter is adopted by the algorithm as it may be implemented by a fixed function digital signal processing (FFDSP) hardware with smaller computation costs and also avoid the error accumulation problem normally seen in infinite impulse response (IIR) filters. Furthermore, using a symmetric filter can reduce the number of multiplications for filtering the image roughly by half, as compared to an asymmetric filter. In one embodiment, the focal distance at which the captured image has the largest focus value is considered the optimal focal distance for the scene and is output by the algorithm.

In one embodiment, a processor and a memory are used to process the images to extract focus values for determining when the image capturing system is in focus. As mentioned above, the processor may be a digital signal processor or an application specific integrated circuit (ASIC). The processor may also be a general purpose processor. The memory may be any storage device suitable for access by the processor.

Figure 1:
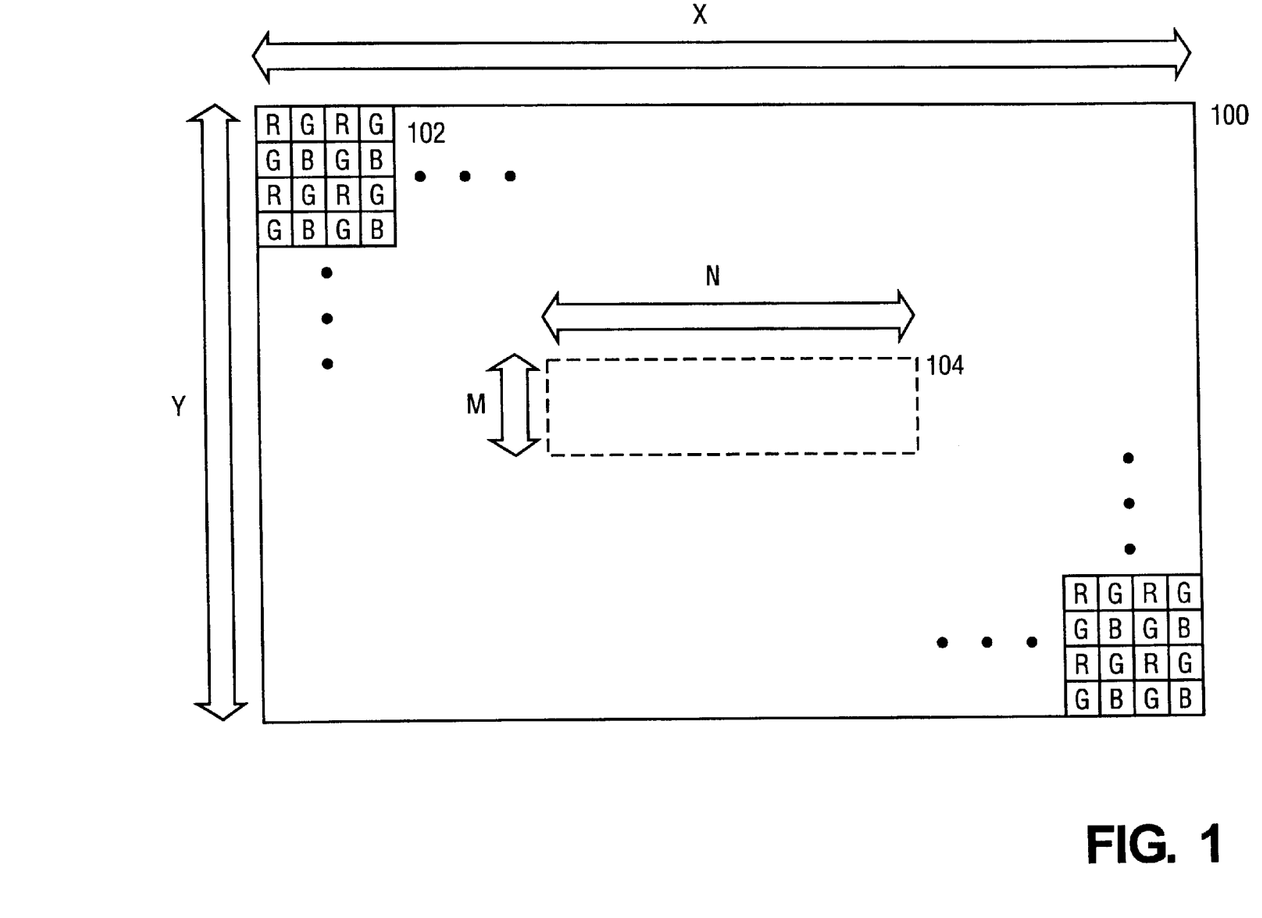
FIG. 1 is a diagram illustrating an image with an area of interest.

FIG. 1 is a diagram illustrating an image 100 with a width X and a height Y. Image 100 is composed of a set of pixels, each overlaid with a color filter from a color filter array (CFA) 102. In one embodiment, CFA 102 is in a Bayer pattern, with a repeated red (R), green (G), green (G), and blue (B) filter pattern. In addition, FIG. 1 also includes an area of interest 104, which has a size of N pixels and M rows.

Figure 2:
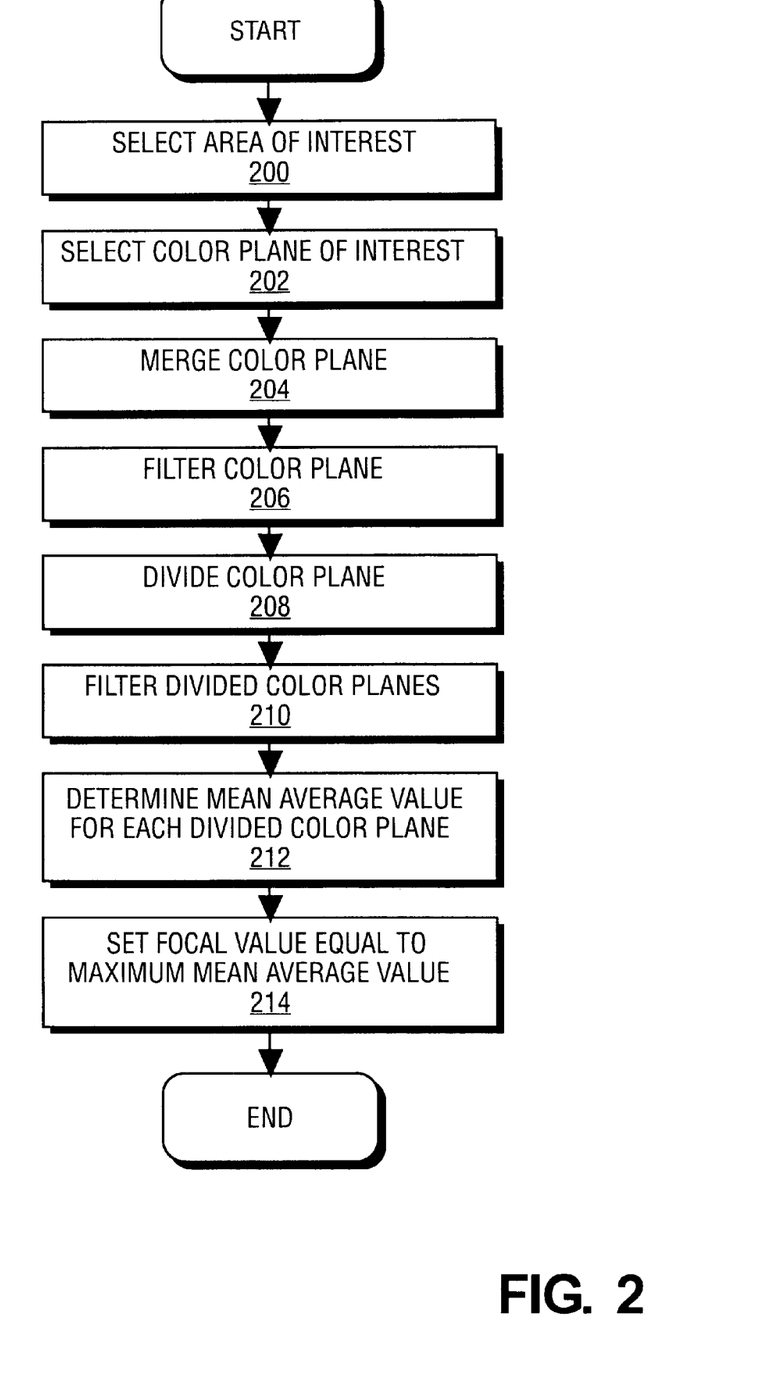
FIG. 2 is a flow diagram illustrating the determination of a focal value (V) from an image such as the image in FIG. 1 in accordance with one mode of operation of the present invention.

FIG. 2 is a flow diagram illustrating the determination of a focal value (V) from an image such as image 100 of FIG. 1 in accordance with one mode of operation of the present invention.

In block 200, an area of interest such as area of interest 104 is selected from an image such as image 100. In one embodiment, only one area of interest is selected from the image in the calculation of the focal value for the image. However, in other embodiments, multiple areas of interest may be chosen, and multiple focal values may be calculated. The following description is directed towards determining one focal value per image. After the area of interest is chosen, operation then continues with block 202.

In block 202, a color plane of interest is chosen from the area of interest. In one embodiment, what is chosen is the green color plane, as the green spectrum is better suited for determining luminance. In other embodiments, another color plane may be chosen with the requirement that the color plane chosen contains most of the luminance information of the scene. For example, in a Y-CYMG (cyan, yellow, and magenta) image capturing system, the yellow plane, which contains most of the luminance information, would be chosen as the color plane of interest. In addition, in the description that follows, the pixel at location (0,0) of the cropped image region (e.g., area of interest 104) is set to be a green pixel. Specifically, the top-left corner of the cropped image region is placed so that the top-left pixel is a green pixel.

In block 204, every two green pixel columns in the cropped image region are merged into a single complete green pixel column to generate a green plane G' of size M×N/2 pixels by the following two steps:

$$G(i,j)=G(i,j+1) \text{ for } i=1, 3, 5, \ldots, M-1 \text{ and } j=0, 2, 4, \ldots, N-2; 1.$$

and, $$G'(i,j/2)=G(i,j) \text{ for } 0 \leq i < M \text{ and } j=0, 2, 4, \ldots, N-2 \quad 2.$$

where, G(i,j) is the value of the green pixel at location (i,j) of the cropped image region. Before the merge, G(i,j) are well defined only at locations (m,n), where (m+n) mod 2=0, $0 \leq m < M$ and $0 \leq n < N$. After the merge, the G' is reduced to a size of M by N/2 pixels. This merge operation is used for the specific CFA pattern (e.g., the Bayer pattern) used in this image capturing system, but may be modified for any CFA pattern as necessary.

In block 206, merged color plane G' is filtered using a low-pass filter to reduce inaccuracies caused by noise (e.g., artifact edges introduced by the use of the Bayer pattern). In one embodiment, the green plane G' is then filtered column-wise by a 3-tap low-pass filter:

$$G_a(i, j) = \begin{cases} a_0 G'(i-1, j) + a_1 G'(i, j) + a_2 G'(i+1, j), \\ \quad \text{for } 0 < i < M-1 \text{ and } 0 \leq j < M/2 \\ G'(i, j), \\ \quad \text{for } i = 0, M-1 \text{ and } 0 \leq j < M/2 \end{cases}$$

where $A=[a_0 \ a_1 \ a_2]=[0.25 \ 0.5 \ 0.25]$. The interpolated green plane $G_a$ remains the same size of M by N/2 pixels. After the green plane G' has been modified to become interpolated green plane $G_a$, operation then continues with block 208.

In block 208, the system divides the interpolated green plane $G_a$ into three sub-regions, $G_1$, $G_2$ and $G_3$, with equal sizes. In one embodiment, the interpolated green plane $G_a$ is divided into three sub-regions of size M×N/6 pixels. In other embodiments, the interpolated green plane $G_a$ may be divided into three sub-regions of size M/3×N/2 pixels. In addition, the interpolated green plane $G_a$ may be divided into multiple regions of any size for other embodiments.

In block 210, the rows of each sub region $G_1$, $G_2$ and $G_3$ are filtered by a p-tap FIR filter:

$$\overline{G}_k(i, j) = \sum_{n=0}^{p-1} h_n G_k(i, j-n)$$

where $h=[h_0, h_1, \ldots h_{p-1}]$; k=1,2,3, $0 \leq i < M$; and $p-1 \leq j < N/6$. The filter attempts to extract relevant edge information useful for determining whether the camera is in focus.

In one embodiment, the p-tap FIR filter used to filter the sub regions $G_1$, $G_2$ and $G_3$ of interpolated green plane $G_a$ is a 20-tap symmetric FIR filter. As noted above, a symmetric FIR filter is used in the algorithm because it can be implemented in current existing hardware with smaller computation costs and the number of multiplications required for filtering the image may be reduced roughly by half when compared to a non-symmetric FIR filter. In addition, as noted above, the FIR filter does not suffer from error accumulation problems normally encountered by IIR filters. Table 1 contains one possible set of filter coefficients of the FIR filter that may be used to produce desired results.

TABLE 1

The coefficients of the symmetric FIR filter.

| $h_n$ | Value |
|---|---|
| $h_0 = h_{19}$ | 0.0006 |
| $h_1 = h_{18}$ | −0.0041 |

TABLE 1-continued

The coefficients of the symmetric FIR filter.

| $h_n$ | Value |
|---|---|
| $h_2 = h_{17}$ | 0.0000 |
| $h_3 = h_{16}$ | 0.0292 |
| $h_4 = h_{15}$ | −0.0350 |
| $h_5 = h_{14}$ | −0.0578 |
| $h_6 = h_{13}$ | 0.1361 |
| $h_7 = h_{12}$ | 0.0000 |
| $h_8 = h_{11}$ | −0.2109 |
| $h_9 = h_{10}$ | 0.1418 |

Figure 3:
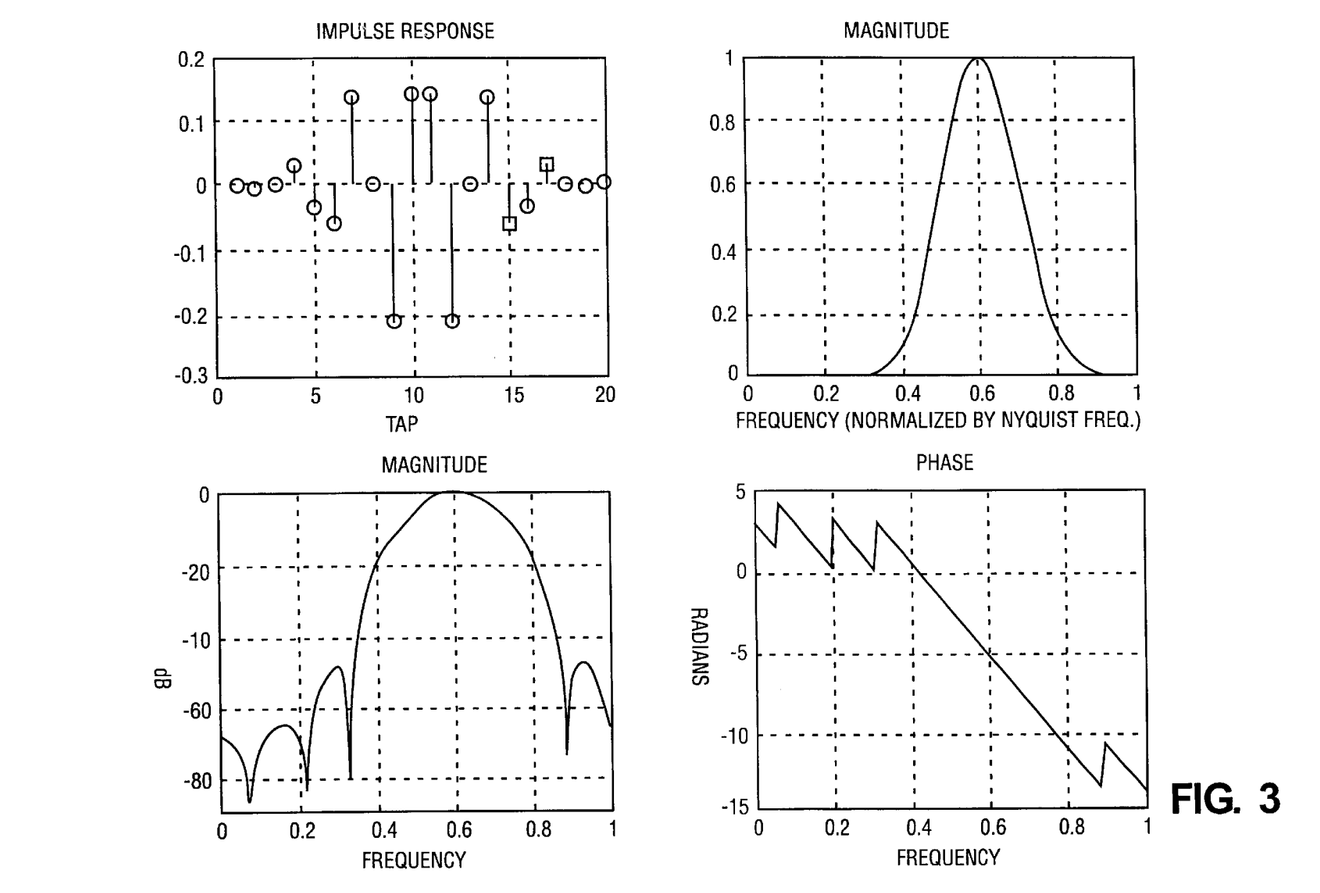
FIG. 3 contains the impulse and frequency responses (both the magnitude and phase responses) of a filter configured in accordance with one embodiment of the present invention.

FIG. 3 shows the impulse and frequency responses (both the magnitude and phase responses) of the filter designed. The filter has a magnitude response similar to a band-pass filter. After each sub-region has been filtered, operation then continues with block 212.

In block 212, a mean absolute value $\overline{A}_k$ is computed for each filtered sub-region $\overline{G}_k$:

$$\overline{A}_k = \frac{1}{M \cdot (N/6 - p + 1)} \sum_{i=0}^{M-1} \sum_{j=p-1}^{N/6-1} |\overline{G}_k(i, j)|$$

where M by (N/6−p+1) is the total number of pixels whose values can be computed according to block 210.

In block 214, the focus value of current image r, denoted as V(r), is determined by:

$$V(r) = \max_{k=1,2,3} \overline{A}_k$$

where an image that is more in focus has a higher focal value.

Figure 4:
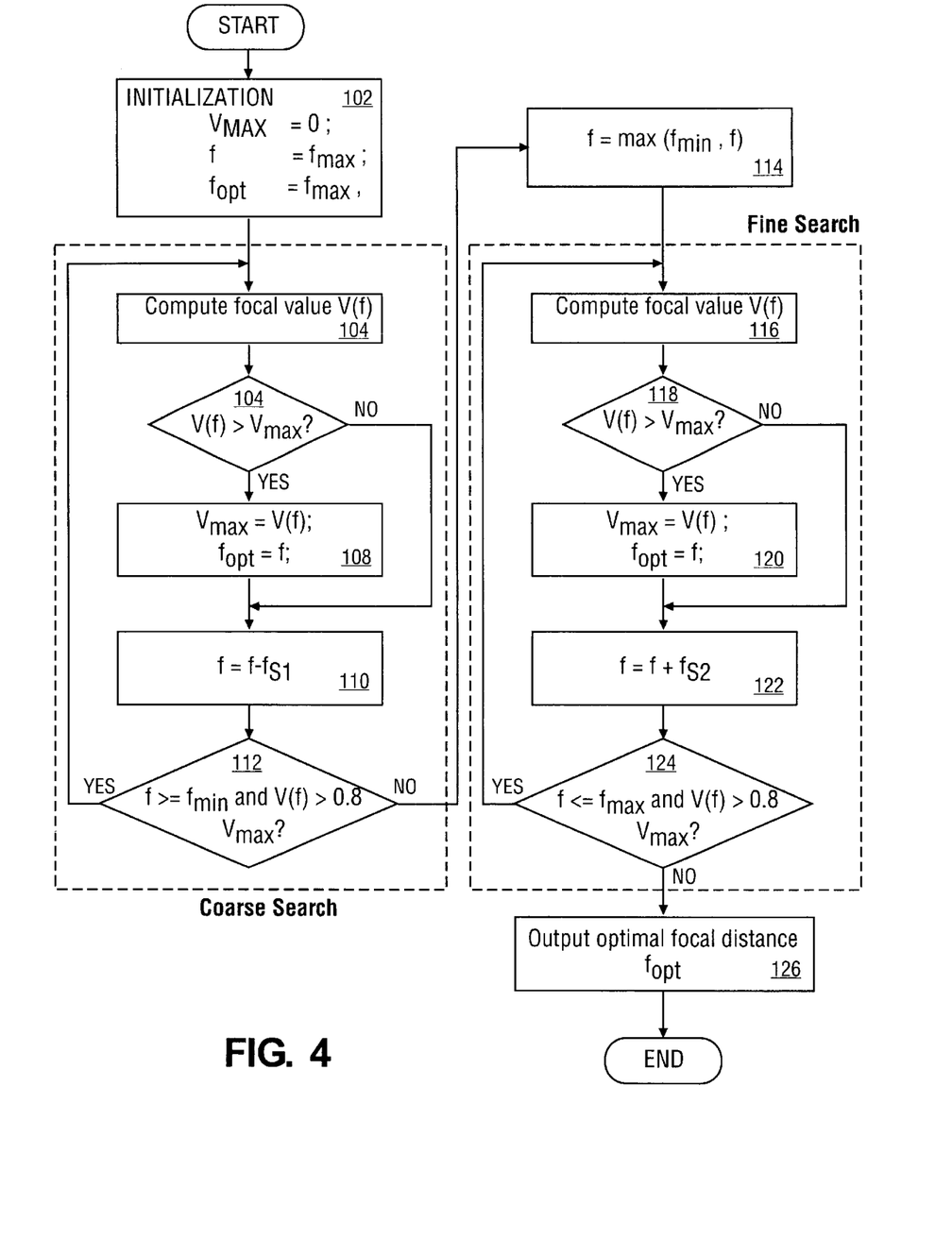
FIG. 4 is a flow diagram illustrating one mode of operation of an auto-focusing system configured in accordance with the present invention.

FIG. 4 is a flow diagram illustrating one mode of operation of an auto-focusing system configured in accordance with the present invention. In one embodiment, the scheme is presented with a series of images captured at different focal distances. In another embodiment, the scheme locates a focal distance at which the image would be focused before a complete series of images at different focal distances are captured. In the latter embodiment, the images to be processed by this scheme are captured as the scheme searches for the focused picture. Generally, the scheme performs a quick search to find a focal length that produces a relatively focused image (e.g., by examining the focal values to find the highest focal value available) and overshoots that focal length to where the focal value is smaller by a certain percentage than the previous focal value. Then, the scheme performs a detailed search to determine a focal length that produces a more in-focus image. This scheme works under the assumption that the computed focus value is a unimodal function of the focal distance, which is the case of most of the scenes encountered.

In block 102, the system is initialized to set the following variables:

$V_{max}=0$
$f=f_{max}$
$f_{opt}=f_{max}$ where f is a focal distance; V(f) is the focal value that is computed for an image taken at f; $V_{max}$ is the largest focal value that has been found; $f_{max}$ and $f_{min}$ are longest and shortest focal distances, respectively, capable by the image capture system; and $f_{opt}$ is the optimal focal distance located by this scheme. After the system has been initialized, the coarse search begins in block 104.

In block 104, a focal value, V(f), is determined for an image captured at the focal distance f. V(f) is determined following the description for FIG. 2. As noted above, if the scheme is not presented with a series of captured images, then the system captures the image immediately during block 104, before the focal value is determined. After the focal value is computed in block 104, it is compared, in block 106, with the maximum focal value that has been found. If the focal value is greater than largest previously calculated focal value (V(f)>$V_{max}$), operation continues with block 108. Otherwise, operation continues with block 110.

In block 108, the maximum focal value found is set to be the current focal value ($V_{max}$=V(f)). In addition, the optimum focal distance is set to be the current focal distance ($f_{opt}$=f). Then, in block 110, the focal distance is decreased by the coarse focal distance searching step (f=f−$f_{S1}$). The coarse focal distance searching step is a step size for changing the focal distance during the search for the coarse focal distance. In one embodiment, the coarse focal distance searching step $f_{S1}$ is found by:

$$f_{S1}=(f_{max}-f_{min})\times SFN1/SN1$$

where SN1 and SFN1 control the total number of image evaluations. SFN1 depends on the current F-Number setting as well as the current focal distance f. SFN1 may be tabularized or formulated with simple equations based on prior experiments. SN1 is a number that controls the number of searches within the coarse search. Generally, when the aperture of the image capturing system is small, the step size may be larger as the image capturing system is in focus over a wider range of focal distances. Conversely, when the aperture of the image capturing system is large, the step size should be smaller as the image capturing system is in focus over a narrow range of focal distances.

In block 112, it is determined whether the focal distance is greater than or equal to the minimum focal distance of the image capture system (f≧$f_{min}$). In addition, it is determined whether the focal value is greater than a certain percentage (e.g., 80%) of the maximum focal value that has been found (V(f)>0.8·$V_{max}$). In one embodiment, the scheme uses a predetermined percentage to evaluate whether the optimum focal value has been passed by the algorithm and the system is now evaluating images that are more and more out of focus (e.g., the focal value is becoming smaller and smaller). In other embodiments, the percentage may be variable based on the current focal distance or other parameters. If the focal distance is greater than or equal to the minimum focal distance of the image capture system (f≧$f_{min}$) and the focal value is greater than a eighty percentage of the maximum focal value that has been found (V(f)>0.8·$V_{max}$), operation returns to block 104, where another image is evaluated. Otherwise, operation continues with block 114.

In block 114, it has been determined that the focal distance that provides a focussed image is contained in the range from the maximum focal distance supported by the image capture system, $f_{max}$, to the current focal distance, f. Specifically, as the coarse search started from the maximum focal distance and examined the focal values of images captured at decreasing focal distances until a preset condition was met, it is logical that the focal distance of interest is contained in the range. However, as the current focal distance is subtracted with the coarse focal distance searching step in block 110, and one of the conditions that would cause the coarse search to end is if the current focal distance is not greater than or equal to $f_{min}$, there is the possibility that the current focal distance is a value that is lower than $f_{min}$, which is not a valid value. Thus, in block 114, the current focal distance is set to be the maximum of either the minimum focal distance of the image capture system or the current focal distance (f=max($f_{min}$,f )).

In block 116, a focal value, V(f), is determined for an image captured at the focal distance f. V(f) is determined following the description for FIG. 2. After the focal value is computed in block 116, it is compared, in block 118, with the maximum focal value that has been found. If the focal value is greater than largest previously calculated focal value (V(f)>$V_{max}$)), operation continues with block 120. Otherwise, operation continues with block 122.

In block 120, the maximum focal value found is set to be the current focal value ($V_{max}$=V(f)). In addition, the optimum focal distance is set to be the current focal distance ($f_{opt}$=f). Then, in block 122, the focal distance is increased by the fine focal distance searching step (f=f+$f_{S2}$). The fine focal distance searching step is a step size for changing the focal distance during the search for the fine focal distance. In one embodiment, the focal distance searching step $f_{S2}$ is found by:

$$f_{S2}=(f_{max}-f_{min})\times SFN2/SN2$$

where SN2 and SFN2 control the total number of image evaluations. SFN2 depends on the current F-Number setting as well as the current focal distance f. SFN2 may be tabularized or formulated with simple equations based on prior experiments. SN2 is a number that controls the number of searches within the fine search. In one embodiment, step size $f_{S2}$ is set much smaller than the step size $f_{S1}$ to have provide higher fine tune capability. Generally, when the aperture of the image capturing system is small, the step size may be larger as the image capturing system is in focus over a wider range of focal distances. Conversely, when the aperture of the image capturing system is large, the step size should be smaller as the image capturing system is in focus over a narrow range of focal distances.

In block 124, it is determined whether the focal distance is less than or equal to the maximum focal distance of the image capture system (f≦$f_{max}$). In addition, it is determined whether the focal value is greater than a certain percentage (e.g., 80%) of the maximum focal value that has been found (V(f)>0.8·$V_{max}$). In one embodiment, the scheme uses a predetermined percentage to evaluate whether the optimum focal value has been passed by the algorithm and the system is now evaluating images that are more and more out of focus (e.g., the focal value is becoming smaller and smaller). In other embodiments, the percentage may be variable based on the current focal distance or other parameters. If the focal distance is less than or equal to the maximum focal distance of the image capture system (f≦$f_{max}$) and the focal value is greater than an eighty percentage of the maximum focal value that has been found (V(f)>0.8·$V_{max}$), operation returns to block 116, where another image is evaluated. Otherwise, operation continues with block 126.

In block 126, the optimal focal distance, $f_{opt}$, is output and the operation ends for the series of images (or, in the case where the system is capturing images as needed for evaluation of the focal value, the operation ends until a new focal distance is needed).

Figure 5:
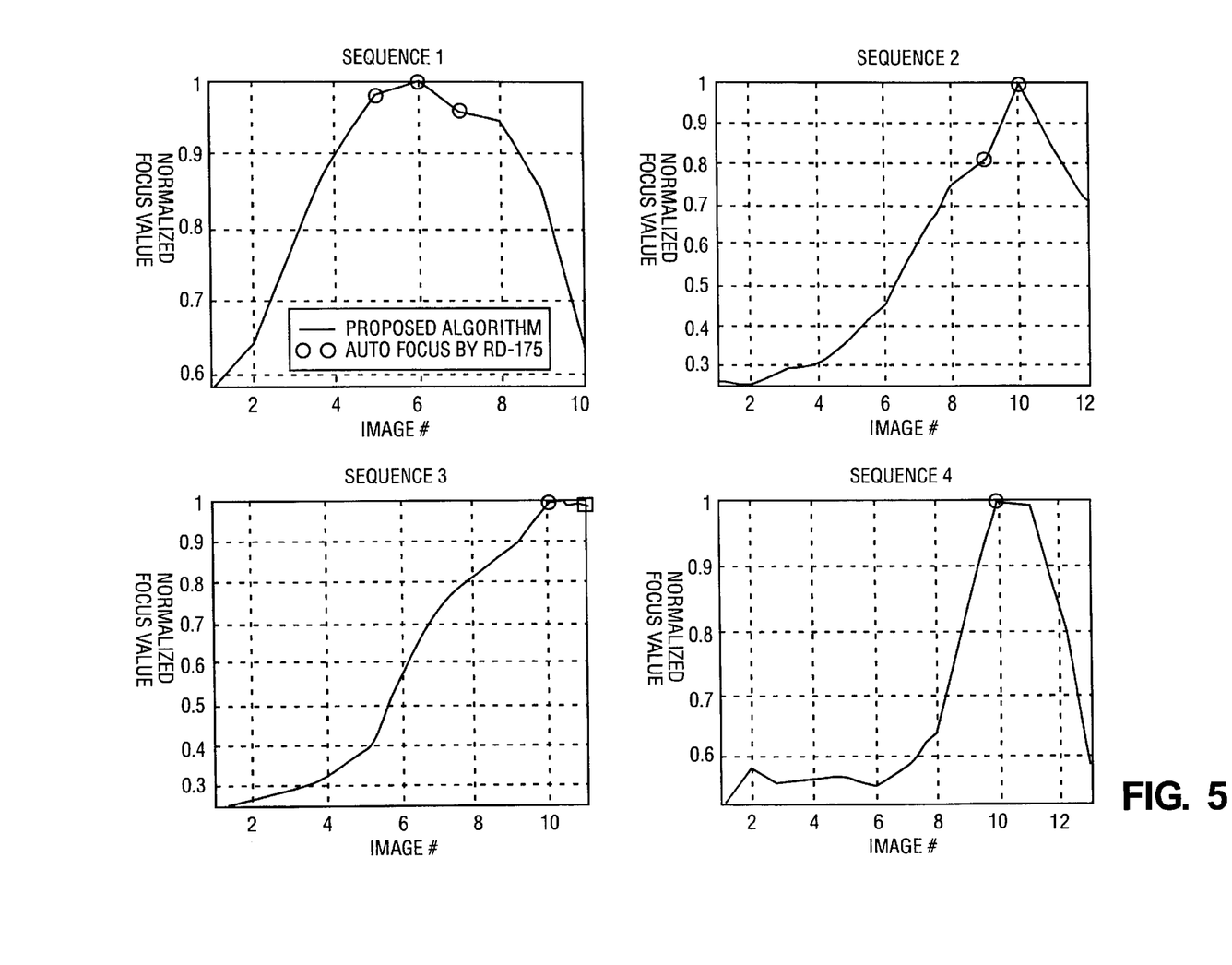
FIG. 5 contains the graphs of the focal values of images from four series of images as determined using the flow diagram of FIG. 2.

FIG. 5 illustrates the focus values for the images of four sequences (normalized to the maximum focus value within each test sequence). The images marked with circles (o) are well focused images indicated. It can be seen in FIG. 5 that the computed focus values may be user to identify well focused images for the four sequences.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for determining a focus value in an image comprising:
    selecting an area of interest in the image;
    selecting a color plane of interest;
    filtering the color plane of interest within the area of interest to produce a filtered region;
    determining the mean absolute value of the filtered region;
    determining if the mean absolute value for the filtered region is greater than a percentage of a largest previously calculated mean absolute value; and
    setting an optimum focal length to be equal to a focal length at which the image is captured if the mean absolute value for the filtered region is greater than the largest previously calculated mean absolute value;
    outputting the optimum focal length if the mean absolute value for the filtered region is not greater than the percentage of the largest previously calculated mean absolute value.

2. The method of claim 1, where filtering the color plane of interest includes:
    dividing the color plane of interest into a set of sub-regions; and
    filtering each sub-region.

3. The method of claim 1, where filtering the color plane of interest includes:
    filtering the color plane of interest using a finite impulse response filter.

4. The method of claim 3, where the finite impulse response filter is a 20-tap finite impulse response filter.

5. The method of claim 1, further including:
    determining if the focal length is within a range of focal values; and
    outputting the optimum focal length if the focal length is not within a range of focal values.

6. The method of claim 1, further including:
    changing the focal length by a step size; and
    capturing a second image at the focal length.

7. The method of claim 6, where the step size is determined by the following formula:

$$f_S = (f_{max} - f_{min}) \times SFN/SN$$

where $f_S$ is the step size; $f_{max}$ is the largest focal length of an image capturing system for capturing the image; $f_{min}$ is the smallest focal length of the image capturing system; SN controls a total number of image evaluations; and SFN is related to an F-number setting as well as the focal distance.

8. An article comprising:
    a machine readable medium having instructions stored thereon which, when executed by a processor, cause an electronic system to
    select an area of interest in an image;
    select a color plane of interest;
    filter the color plane of interest within the area of interest to produce a filtered region;
    determine the mean absolute value of the filtered region;
    determine if the mean absolute value for the filtered region is greater than a percentage of a largest previously calculated mean absolute value;
    set an optimum focal length to be equal to a focal length at which the image is captured if the mean absolute value for the filtered region is greater than the largest previously calculated mean absolute value; and
    output the optimum focal length if the mean absolute value for the filtered region is not greater than the percentage of the largest previously calculated mean absolute value.

9. The article of claim 8, where the medium includes further instructions which cause the system to
    divide the color plane of interest into a set of sub-regions; and,
    filter each sub-region.

10. The article of claim 8, where the medium includes further instructions which cause the filtering of the color plane of interest to include:
    filtering the color plane of interest using a finite impulse response filter.

11. The article of claim 10, where the instructions define the finite impulse response filter as a 20-tap finite impulse response filter.

12. The article of claim 8, where the medium includes further instructions which
    determine if the focal length is within a range of focal values; and
    output the optimum focal length if the focal length is not within a range of focal values.

13. The article of claim 8, where the medium includes further instructions which
    change the focal length by a step size; and
    capture a second image at the focal length.

14. The article of claim 13, where the machine readable medium has further instructions that cause the step size to be determined by the following formula:

$$f_S = (f_{max} - f_{min}) \times SFN/SN$$

where $f_S$ is the step size; $f_{max}$ is the largest focal length of an image capturing system for capturing the image; $f_{min}$ is the smallest focal length of the image capturing system; SN controls a total number of image evaluations; and SFN is related to an F-number setting as well as the focal distance.

15. A system for determining a focus value for an image comprising:
    a processor; and
    a memory coupled to the processor, the memory containing instructions stored thereon which, when executed by the processor,
    select an area of interest in the image,
    select a color plane of interest,
    filter the color plane of interest within the area of interest to produce a filtered region,
    determine the mean absolute value of the filtered region,
    determine if the mean absolute value for the filtered region is greater than a percentage of a largest previously calculated mean absolute value, set an optimum focal length to be equal to a focal length at which the image is captured if the mean absolute value for the filtered region is greater than the largest previously calculated mean absolute value, and output the optimum focal length if the mean absolute value for the filtered region is not greater than the percentage of the largest previously calculated mean absolute value.

16. The system of claim 15, where filtering the color plane of interest includes:

dividing the color plane of interest into a set of sub-regions; and filtering each sub-region.

17. The system of claim 15, where filtering the color plane of interest includes:

filtering the color plane of interest using a finite impulse response filter.

18. The system of claim 17, where the finite impulse response filter is a 20-tap finite impulse response filter.

19. The system of claim 15, where the memory further contains instructions stored thereon which, when executed, determine if the focal length is within a range of focal values and output the optimum focal length if the focal length is not within a range of focal values.

20. The system of claim 15, where the memory further contains instructions stored thereon which, when executed, change the focal length by a step size and capture a second image at the focal length.

21. The system of claim 20, where the step size is determined by the following formula:

$$f_S = (f_{max} - f_{min}) \times SFN/SN$$

where $f_S$ is the step size; $f_{max}$ is the largest focal length of an image capturing system for capturing the image; $f_{min}$ is the smallest focal length of the image capturing system; SN controls a total number of image evaluations; and SFN is related to an F-number setting as well as the focal distance.

22. The article of manufacture of claim 10 wherein the finite impulse response filter is symmetric.

23. The article of manufacture of claim 9 wherein the medium includes further instructions that, when executed, low pass filter a plurality of merged portions of the selected color plane of interest within the area of interest, prior to dividing the color plane of interest.

24. The method of claim 2 further comprising:

low pass filtering a plurality of merged portions of the selected color plane of interest within the area of interest, prior to dividing the color plane of interest.

25. The system of claim 17 wherein the finite impulse response filter is symmetric.

26. The system of claim 16 wherein the memory includes further instructions that, when executed, low pass filter a plurality of merged portions of the selected color plane of interest within the area of interest, prior to dividing the color plane of interest.

* * * * *

UNITED STATES PATENT AND TRADEMARK OFFICE
CERTIFICATE OF CORRECTION

PATENT NO. : 6,373,481 B1
DATED : April 16, 2002
INVENTOR(S) : Tan et al.

It is certified that error appears in the above-identified patent and that said Letters Patent is hereby corrected as shown below:

Column 3,
Line 44, delete "p--1", insert -- p-1 --.

Column 7,
Line 3, delete "user", insert -- used --.

Signed and Sealed this

Seventeenth Day of September, 2002

Attest:

JAMES E. ROGAN
Attesting Officer    Director of the United States Patent and Trademark Office